(12) United States Patent
Abe et al.

(10) Patent No.: US 7,108,911 B2
(45) Date of Patent: *Sep. 19, 2006

(54) ADHESIVE COMPOSITION AND ADHESIVE SHEET

(75) Inventors: Hidetoshi Abe, Yamagata (JP); Takeshi Koyama, Tokyo (JP)

(73) Assignee: 3M Innovative Properties Company, St. Paul, MI (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/399,744

(22) PCT Filed: Oct. 19, 2001

(86) PCT No.: PCT/US01/49791

§ 371 (c)(1),
(2), (4) Date: Apr. 21, 2003

(87) PCT Pub. No.: WO02/057387

PCT Pub. Date: Jul. 25, 2002

(65) Prior Publication Data

US 2004/0022984 A1    Feb. 5, 2004

(51) Int. Cl.
*B32B 33/00* (2006.01)

(52) U.S. Cl. ............... 428/355 R; 428/40.1; 428/41.5; 428/355 AC; 428/355 N

(58) Field of Classification Search ............... 428/40.1, 428/41.5, 355 R, 355 AC, 355 N
See application file for complete search history.

(56) References Cited

U.S. PATENT DOCUMENTS

| 5,192,612 A | 3/1993 | Otter et al. ................. 428/355 |
| 5,346,766 A | 9/1994 | Otter et al. ................. 428/355 |
| 5,412,035 A | 5/1995 | Schmitt et al. ............... 525/93 |
| 2004/0037990 A1 * | 2/2004 | Abe et al. .................. 428/40.1 |
| 2004/0132922 A1 * | 7/2004 | Abe ........................... 525/418 |

FOREIGN PATENT DOCUMENTS

| DE | 3621885 | 1/1987 |
| EP | JP-A-6-510548 | 11/1994 |
| EP | 571548 B | 5/1998 |
| JP | B-3021646 | 3/2000 |
| JP | 2000-119624 | 4/2000 |
| WO | WO01/34716 | 5/2001 |
| WO | WO02/10299 | 2/2002 |

OTHER PUBLICATIONS

Database WPI Wk. 9929, Derwent Publ. Ltd., London, GB AN 1999-341755 & JP11124560 (Toyo Ink), May 11, 1999 (abstract).

* cited by examiner

*Primary Examiner*—Nasser Ahmad
(74) *Attorney, Agent, or Firm*—Colene H. Blank

(57) ABSTRACT

To provide an adhesive composition which can effectively improve the thermal-peeling-easy properties and the adhesion properties at low temperature at the same time. An adhesive composition comprising a crystalline polymer which comprises polyol units formed from a crystalline polyol as repeating units in the molecule, and a tackifying polymer compatible with said crystalline polymer at a temperature higher than the melting point of said crystalline polymer, wherein the tackifying polymer has an alkyl group with 4 to 8 carbon atoms and a carboxyl group in the molecule, a content of the monomeric units having the alkyl group with 4 to 8 carbon atoms (repeating units derived from a starting monomer having the alkyl group) is 60 to 99 mole % of the whole monomeric units of the tackifying polymer, and the alkyl group includes a butyl group.

4 Claims, No Drawings

ADHESIVE COMPOSITION AND ADHESIVE SHEET

FIELD OF THE INVENTION

The present invention relates to the improvement of an adhesive composition comprising a tackifying polymer and a crystalline polymer compatible with the crystalline polymer at a temperature higher than the melting point of the crystalline polymer.

Such an adhesive composition is particularly useful as a material for the adhesive layer of an adhesive sheet. Such an adhesive sheet is preferably used in the fields of advertisement, decoration, signs, electronic parts, medical applications, etc. The adhesive sheets of the present invention include the forms of adhesive materials which are called adhesive films or tapes.

BACKGROUND OF THE INVENTION

Adhesives comprising tackifying polymers as main components are called pressure-sensitive adhesives (tackifiers), and can be firmly adhered to materials by simply applying a pressure to the adhesives. When the adhesive contains a tackifying polymer and a crystalline polymer, it can be used as a heat-sensitive adhesive.

As such an adhesive containing a tackifying polymer and a crystalline polymer, for example, U.S. Pat. No. 5,192,612 (corresponding to JP-B-3021646) discloses a pressure-sensitive composition comprising a pressure-sensitive adhesive base resin (a tackifying polymer such as an acrylic polymer), a detackifying resin and a detackifying particulate. A specific preferable example of the detackifying resin is substantially linear polycaprolactone having a molecular weight of about 3,000 to about 342,000. Polycaprolactone is a crystalline polymer which exhibits non-tackifying properties at room temperature (about 15 to 30° C.).

The above-described pressure-sensitive adhesive can be adhered to an adherent by pressing the adhesive against the adherent. The above detackifying resin and the detackifying particles effectively reduce tack on the surface of the adhesive at room temperature and improve repeelability. The detackifying particles are inorganic particles such as silica.

In the above U.S. Patent, it is not supposed that the adhesive material is peeled (including thermal peeling) during or after the use of the adhesive material after the final adhesion. Therefore, the adhesive as such cannot be used as an adhesive having thermal-peeling-easy properties, which are described below. To impart the thermal-peeling-easy properties to the adhesive, the compatibility of the crystalline polymer and the tackifying polymer should be improved, as described below. However, the above U.S. Patent does not disclose the improvement of the molecular structure (the kinds of functional groups and/or substituents in the molecule, a weight average molecular weight, etc.) of the tackifying polymer to increase the compatibility with the crystalline polymer.

U.S. Pat. No. 5,412,035 (corresponding to JP-A-6-510548) discloses a pressure sensitive adhesive composition which becomes pressure sensitive at least at one temperature in the range between 20° C. and 40° C., and comprises a polymeric pressure-sensitive adhesive component and a crystalline polymer.

The crystalline polymer is usually non-tacky at room temperature and molecularly designed so that it has good compatibility with the polymeric pressure-sensitive adhesive component.

The melting point Ta (° C.) of the crystalline polymer, which is measured in the composition, is lower than the melting point Tm (° C.) of the crystalline polymer as such, and the difference Tm—Ta is preferably from 1° C. to 9° C. In the above U.S. patent, Tm is preferably from 20° C. to 102° C.

The adhesive composition disclosed has the thermal-peeling-easy properties (thermal peelability), that is, a peel strength P2 (g/cm) at a certain temperature higher than Ta is smaller than a peel strength P1 (g/cm) at a certain temperature lower than Ta. This publication discloses neither the use of crystalline polyols such as polycaprolactone nor the improvement of the molecular structure (e.g. the kinds of the functional groups and/or substituents in the molecule, etc.) of the tackifying polymer to improve the compatibility with polycaprolactone and make it compatible with polycaprolactone at a temperature higher than the melting point of polycaprolactone. Furthermore, this publication does not disclose the improvement to increase the thermal peelability and the adhesion properties at low temperature (low temperature adhesion properties) of such an adhesive composition at the same time.

JP-A-2000-119624 discloses an adhesive composition comprising a specific tackifying polymer and crystalline polycaprolactone. Using the disclosed adhesive composition, an article can be adhered to an adherent by heat pressing (pressing after heating or pressing while heating). It is essential for the disclosed tackifying polymer to have two functional groups, that is, a hydroxyl group and a phenyl group, in the molecule, and the compatibility with polycaprolactone is improved by the functions of these functional groups. With such an adhesive, the tack on the adhesion surface at room temperature (about 25° C.) can be avoided with the function of the crystalline polymer having the polyol units such as polycaprolactone in the molecule.

None of the above publications disclose thermally peelable adhesive compositions comprising crystalline polyurethane as a crystalline polymer having polyol units formed from a crystalline polyol as repeating units.

SUMMARY OF THE INVENTION

Meanwhile, in the case of adhesive sheets used outdoors (advertising application, etc.), it is sometimes required for the adhesive sheets to have improved adhesion properties (peel strength) at relatively low temperature (lower than 10° C.) so that they can be used in the winter season in Japan. In some cases, the good thermal peeling properties are required together with the improvement of such low temperature adhesion properties. In such a case, a crystalline polymer is advantageous for the improvement of the thermal peeling properties and the low temperature adhesion properties, when the crystalline polymer is (1) a crystalline polyol such as polycaprolactone, etc. or (2) a crystalline polyurethane comprising repeating units formed from a crystalline polyol as repeating units in the molecule.

However, the tackifying polymer having a relatively large number of phenyl groups in the molecule, which is disclosed in JP-A-2000-119624, has a high glass transition temperature Tg. Thus, an adhesive composition comprising such a tackifying polymer and a crystalline polymer compatible therewith tends to have decreased low temperature adhesion properties.

Thus, the present inventors have made extensive research and study on material selection conditions for the effective improvement of the thermal peeling properties and the low temperature adhesion properties at the same time in adhesive compositions comprising a crystalline polyol or polyurethane comprising the units derived from such a crystalline polyol as repeating units in the backbone molecule. As a result, it has been found that the following two points are important:

(1) A substituent (or a functional group) which is included in the tackifying polymer molecule is suitably selected to decrease the Tg of the tackifying polymer as much as possible and, at the same time, to improve the compatibility of the tackifying polymer and the crystalline polymer.

(2) A substituent which is included in the tackifying polymer molecule is suitably selected to decrease the Tg of the tackifying polymer as much as possible and make the molecular weight of the tackifying polymer relatively large and, at the same time, the kind of the crystalline polymer is selected so that the compatibility of the tackifying polymer and the crystalline polymer is improved.

The present inventors have made further research and study on the selection and combination of such materials which match the above conditions, and have completed the present invention.

That is, one object of the present invention is to provide an adhesive composition which can effectively improve the thermal peeling properties (thermal-peeling-easy properties) and the adhesion properties at low temperature at the same time.

To achieve the above object, the present invention provides an adhesive composition comprising a crystalline polymer and a tackifying polymer compatible with said crystalline polymer at a temperature higher than the melting point of said crystalline polymer, characterized in that said crystalline polymer comprises polyol units formed from a crystalline polyol as repeating units in the molecule, said tackifying polymer has an alkyl group with 4 to 8 carbon atoms and a carboxyl group in the molecule, a content of the monomeric units having said alkyl group with 4 to 8 carbon atoms (repeating units derived from a starting monomer having said alkyl group) is 60 to 99 mole % of the whole monomeric units of said tackifying polymer, and said alkyl group includes a butyl group; and an adhesive composition comprising a crystalline polymer and a tackifying polymer compatible with said crystalline polymer at a temperature higher than the melting point of said crystalline polymer, characterized in that said crystalline polymer is polyurethane which comprises polyol units formed from a crystalline polyol as repeating units in the molecule, said tackifying polymer has an alkyl group with 4 to 8 carbon atoms and a carboxyl group in the molecule, a content of the monomeric units having said alkyl group with 4 to 8 carbon atoms (repeating units derived from a starting monomer having said alkyl group) is 60 to 99 mole % of the whole monomeric units of said tackifying polymer, and said tackifying polymer has a weight average molecular weight of 500,000 to 2,000,000.

DETAILED DESCRIPTION OF THE INVENTION

The adhesive composition of the first embodiment of the present invention is characterized in that (1) the crystalline polymer comprises polyol units formed from a crystalline polyol as repeating units in the molecule, (2) the tackifying polymer has a butyl group and a carboxyl group in the molecule, and (3) a content of the monomeric units having said alkyl group with 4 to 8 carbon atoms (repeating units derived from a starting monomer having said alkyl group) is 60 to 99 mole % of the whole monomeric units of said tackifying polymer.

The tackifying polymer having a butyl group and a carboxyl group in the molecule can improve the thermal peeling properties since it is compatible with the crystalline polymer at a temperature higher than the melting point of the crystalline polymer. Furthermore, such a tackifying polymer does not need a phenyl group to improve the compatibility with the crystalline polymer. The butyl groups do not unnecessarily increase the Tg of the tackifying polymer even if the tackifying polymer has the relatively large number of the butyl groups.

In addition, the amount of the monomeric units having the alkyl group with 4 to 8 carbon atoms is from 60 to 99 mole % of the whole monomeric units of the tackifying polymer. Therefore, the Tg of the tackifying polymer can be effectively lowered.

The crystalline polymer comprising the polyol units derived from the crystalline polyol as the repeating units in the molecule includes the crystalline polyol itself, and "crystalline polyurethane" comprising the polyol units as the repeating units in the molecule.

The reason why the tackifying polymer having the butyl group and the carboxyl group in the molecule has good compatibility with the crystalline polymer has not been clarified, but it may be assumed as follows:

Usually, the backbone molecule of the crystalline polyol comprises an alkylene group having 3 or more carbon atoms. The alkylene group of the crystalline polyol and the butyl group of the tackifying polymer have similar structures. Thus, if there were some trigger inducing the compatibilizing of the two polymers, they would be compatibilized. In the meantime, the backbone molecule of the polyol include a bond having an oxygen atom (e.g. ester bond, ether bond, etc.), while the tackifying polymer has a carboxyl group. The hydroxyl group of the carboxyl group and the oxygen atom in the oxygen-containing bond of the backbone molecule of the polyol may attract each other and trigger the compatibilizing of the polymers. Such attraction of the hydroxyl group and the oxygen atom may be due to the hydrogen bond.

From such viewpoints, the polyol units of the crystalline preferably comprise a backbone of an alkylene having 4 to 6 carbon atoms, since the compatibility of the tackifying polymer having the butyl group and the carboxyl group and the crystalline polymer becomes particularly good.

Examples of the polyol units comprising the $C_4$–$C_6$ alkylene backbones include tetramethylene glycol, ring-opened caprolactone, ring-opened valerolactone, adipates, hexanediol, etc.

The preferable crystalline polymer is (1) a crystalline polycaprolactone itself or (2) a crystalline polyurethane comprising polycaprolactone units (reaction residues derived from the crystalline polycaprolactone) as the repeating units in the molecule.

The particularly preferable crystalline polymer is the crystalline polyurethane (2) since it is advantageous to increase the compatibility with the tackifying polymer.

When the content of the monomeric units of the alkyl group with 4 to 8 carbon atoms in the tackifying polymer is less than 60 mole %, the low temperature adhesion properties of the adhesive composition cannot be effectively improved.

When the tackifying polymer does not contain any functional group which increases the compatibility of the tackifying polymer with the crystalline polymer other than the butyl group and the carboxyl group, the ratio of the monomeric units comprising the butyl groups decreases and thus the compatibility of the tackifying polymer and the crystalline polymer tends to deteriorate.

When the content of the monomeric units of the alkyl group with 4 to 8 carbon atoms exceeds 99 mole %, the content of the monomeric units having the carboxyl groups decreases. In such a case, the compatibility of the tackifying polymer and the crystalline polymer tends to deteriorate. The decrease of the compatibility leads to the deterioration of the thermal peeling properties of the adhesive composition.

Accordingly, to increase the low temperature adhesion properties and the thermal peeling properties with good balance, the content of the monomeric units of the alkyl group with 4 to 8 carbon atoms is preferably from 65 to 98 mole %, particularly preferably from 70 to 95 mole %.

In the adhesive composition of the first embodiment, the content of the crystalline polymer is not limited insofar as the effects of the present invention are not impaired. In general, the content of the crystalline polymer is from 1 to 50 wt. % (in terms of the non-volatiles), preferably from 2 to 45 wt. %, particularly preferably from 3 to 40 wt. %, based on the whole weight of the adhesive composition.

When the content of the crystalline polymer is too low, the thermal peeling properties may deteriorate. When the content of the crystalline polymer is too high, the low temperature adhesion properties may not be effectively improved.

In the first embodiment of the present invention, the Tg (glass transition temperature) of the tackifying polymer is usually from −50 to −10° C., preferably from −40 to −12° C., particularly preferably from −30 to −15° C. When the Tg of the tackifying polymer is too high, the low temperature adhesion properties may not be improved. When the Tg of the tackifying polymer is too low, the thermal peeling properties may deteriorate.

The adhesive composition of the second embodiment is characterized in that An adhesive composition comprising a crystalline polymer and a tackifying polymer compatible with said crystalline polymer at a temperature higher than the melting point of said crystalline polymer, characterized in that (i) the crystalline polymer is polyurethane which comprises polyol units formed from a crystalline polyol as repeating units in the molecule, (ii) the tackifying polymer has an alkyl group with 4 to 8 carbon atoms and a carboxyl group in the molecule, (iii) a content of the monomeric units having said alkyl group with 4 to 8 carbon atoms (repeating units derived from a starting monomer having said alkyl group) is 60 to 99 mole % of the whole monomeric units of said tackifying polymer, and (iv) the tackifying polymer has a weight average molecular weight of 500,000 to 2,000,000.

The tackiyfing polymer having the above alkyl group and the carboxyl group in the molecule can improve the thermal peeling properties since it is compatible with the crystalline polyurethane at a temperature higher than the melting point of the crystalline polyurethane. Furthermore, such a tackifying polymer does not need a phenyl group to improve the compatibility with the crystalline polyurethane. The content of the monomeric units having the alkyl group with 4 to 8 carbon atoms in the tackifying polymer is from 60 to 99 mole %. When the alkyl group has 8 or less carbon atoms, it has a much lower function to increase the Tg of the tackifying polymer than a phenyl group. Thus, it is advantageous to decrease the Tg of the tackifying polymer.

In the second embodiment, the Tg of the tackifying polymer may be slightly higher than that in the first embodiment, since the relatively large molecular weight of the tackifying polymer (at least 50,000) may improve the low temperature adhesion properties of the adhesive composition. Accordingly, the Tg of the tackifying polymer may be usually from −50 to −5° C., preferably from −40 to −7° C. When the Tg of the tackifying polymer is too high, the low temperature adhesion properties may not be improved. When the Tg of the tackifying polymer is too low, the thermal peeling properties may deteriorate.

The reason why the above tackifying polymer has good compatibility with the crystalline polyurethane has not been clarified, but it may be assumed as follows:

Usually, the backbone molecule of the crystalline polymer comprises an alkylene group having 3 or more carbon atoms as described above. The alkylene group of the crystalline polyol and the alkyl groups except the butyl group (the alkyl groups having 5 to 8 carbon atoms) of the tackifying polymer have relatively low effects to improve the compatibility due to the structural similarity in comparison with the butyl group. However, if there were a strong trigger inducing the compatibilizing of the two polymers, they would be compatibilized. Polyurethane contains urethane bonds in the molecule in addition to the oxygen-containing bonds of the polyol backbone molecule. Thus, besides the attraction between the oxygen-containing bonds of the polyol backbone molecule and the carboxyl groups, (i) the attraction between the NH (nitrogen-hydrogen) bonds in the urethane bonds and the carbonyl groups (C=O) in the carboxyl groups of the tackifying polymer, and (ii) the attraction between the carbonyl groups (C=O) in the urethane bonds and the OH groups in the carbonyl groups of the tackifying polymer may be expected to trigger the compatibilizing of the polymers.

When the molecular weight of the tackifying polymer is increased, the number of the alkyl groups contained in one molecule of the polymer increases. Thus, the cumulative effect achieved by the increase of the number of the alkyl group can be expected, if the effect to increase the compatibility of the polymer due to the structural similarity of the alkyl groups is less than the butyl group.

That is, the effect of the urethane bonds of the crystalline polymer and the effect (cumulative effect) of the number of the alkyl groups with 4 to 8 carbon atoms in the tackifying polymer may synergistically increase the compatibility of the polymers.

When the weight average molecular weight of the tackifying polymer exceeds 2,000,000, the function to lower the compatibility due to the increase of the molecular weight becomes significant. Therefore, the weight average molecular weight preferably does not exceed 2,000,000. In view of the balance between the cumulative effects of the alkyl groups and the effects of the molecular weight, the weight average molecular weight of the tackifying polymer is preferably from 1,000,000 to 1,500,000.

Herein, the "molecular weight" is a polystyrene-converted molecular weight measured with GPC. In the case of the tackifying polymer, the molecular weight is that of the uncrosslinked tackifying polymer.

From the viewpoint of the improvement of the compatibility, the polyol units formed from the crystalline polyol preferably comprise the alkylene backbone having 4 to 6 carbon atoms.

One preferable crystalline polyurethane is prepared using polycaprolactone as the crystalline polyol and comprises reaction residues derived from polycaprolactone as the polyol units (polycaprolactone polyurethane), since this polyurethane has particularly good compatibility with the tackifying polymer having the above alkyl group and the carboxyl group.

When the content of the monomeric units of the alkyl group with 4 to 8 carbon atoms in the tackifying polymer is less than 60 mole %, the low temperature adhesion properties of the adhesive composition cannot be effectively improved.

When the content of the monomeric units of the alkyl group with 4 to 8 carbon atoms exceeds 99 mole %, the content of the monomeric units having the carboxyl groups decreases. In such a case, the compatibility of the tackifying polymer and the polyurethane tends to deteriorate, and thus the thermal peeling properties of the adhesive composition deteriorate.

Accordingly to increase the low temperature adhesion properties and the thermal peeling properties with good balance, the content of the monomeric units of the alkyl group with 4 to 8 carbon atoms is preferably from 65 to 98 mole %, particularly preferably from 70 to 95 mole %.

In the adhesive composition of the second embodiment, the content of the crystalline polyurethane is not limited insofar as the effects of the present invention are not impaired. In general, the content of the crystalline polyurethane is from 1 to 50 wt. % (in terms of the non-volatiles), preferably from 2 to 45 wt. %, particularly preferably from 3 to 40 wt. %, based on the whole weight of the adhesive composition.

When the content of the crystalline polyurethane is too low, the thermal peeling properties may deteriorate. When the content of the crystalline polyurethane is too high, the low temperature adhesion properties may not be effectively improved.

Tackifying Polymer

The tackifying polymer used in the first and second embodiments of the present invention is a polymer which is tacky at room temperature (about 25° C.), and compatible with the crystalline polymer when it is heated to a temperature not lower than the melting point of the crystalline polymer. The tackifying polymer is preferably crosslinkable. The tackifying polymer is particularly preferably crosslinked to increase the thermal peeling properties.

Whether the tackifying polymer is compatibilized with the crystalline polymer when heated to a temperature not lower than the melting point of the polyol units can be determined with the clarity of the adhesive composition, that is, the change (decrease) of haze. For example, the transparency of a film adhesive (a film-form adhesive) consisting of the adhesive composition of the present invention and having a thickness of 20 to 60 μm is compared between the heated state at a temperature not lower than the melting point of the crystalline polymer and the state at a temperature lower than the melting point (for example, room temperature, about 25° C.). At room temperature, the crystalline polymer usually forms fine crystals and dispersed in the matrix comprising the tackifying polymer. Thus, the film adhesive has relatively high transparency, and the haze measured with a color difference meter is 5% or more (usually 20% or less). When the crystalline polymer is molten and compatibilized with the tackifying polymer at a temperature not lower than the melting point of the crystalline polymer, the haze decreases, and the film adhesive becomes substantially transparent. If the crystalline polymer is molten but is not compatibilized with the tackifying polymer, the haze does not substantially change. In such a case, the smaller haze means better compatibility. Accordingly, the haze of the film adhesive measured with the color difference meter is preferably 3% or less, more preferably 2% or less, when the polyurethane and the tackifying polymer are in the compatibilized state.

The compatibility of the crystalline polymer and the tackifying polymer can be simply judged by the transparency of a solution containing the two polymers. That is, one prerequisite for the good compatibility between the tackifying polymer and the crystalline polymer is that a transparent mixture forms, when the first solution containing the dissolved tackifying polymer and the second solution containing the dissolved crystalline polymer are mixed.

Also, the compatibility of the two polymers can be confirmed by checking the transmission of polarized light with a polarization microscope. As is well known, when the polarization axes of a pair of polarizing plates are crossed at right angles, no light passes, so that the view becomes substantially dark.

One pair of polarizing plates, which are arranged so that their polarization axes are crossed at right angles, are observed with inserting the film adhesive made of the adhesive composition of the present invention between them. At room temperature, the fine crystals of the crystalline polymer rotate the polarizing plane of the light entering the film adhesive, and thus the light is allowed to pass through the both polarization plates. Since the directions of the crystal axes are usually random, the crystalline polymer contains the crystals which rotate the polarization plane just 90 degrees to allow the light to pass through the both polarization plates, and also the crystals which hardly allow the light to pass through the polarization plates. As the fine crystals of the crystalline polymer are smaller and better dispersed, they have the larger compatibility with the tackifying polymer. Accordingly, as the compatibility of the both polymers increases, the crystal size decreases, and thus the entire film in the field of view of the microscope (100 to 200 times magnification) is observed faintly bright. When the compatibility of the polymers is low, the crystal size becomes large, and thus the crystals can be observed as bright spots which are sprinkled on the dark background. When the crystalline polymer is molten and becomes compatible with the tackifying polymer, the polymer mixture contained in the film adhesive is optically isotropic, and is darker than at room temperature.

The tackifying polymers used in the first and second embodiments may comprise acrylic polymers, nitrite-butadiene copolymers (NBR, etc.), amorphous polyurethane, silicone polymers, etc. The tackifying polymers may be used singly or in admixture of two or more.

Tackifying Polymer in the First Embodiment

The tackifying polymer used in the first embodiment of the present invention may be prepared by polymerizing a monomer mixture (a starting monomer mixture) containing the monomer having the butyl group in the molecule, the monomer having the carboxyl group in the molecule, and optionally other copolymerizable monomer. Alternatively, the carboxyl groups in the molecule may be converted to the butyl groups after polymerization.

Now, one preferred example of the acrylic polymer, which is preferably used in first embodiment, is explained.

Such a polymer is an acrylic polymer prepared by polymerizing a monomer mixture (a starting monomer mixture)

containing (A) a (meth)acrylic monomer having a butyl group in the molecule and (B) a (meth)acrylic monomer having a carboxyl group in the molecule. Such a polymer may be prepared by carrying out the copolymerization by a conventional method such as solution polymerization.

As the (meth)acrylic monomer (A) having a butyl group in the molecule, n-butyl (meth)acrylate, isobutyl (meth)acrylate, butoxyethyl (meth)acrylate, and the like may be used. Preferably, n-butyl (meth)acrylate is used.

As the (meth)acrylic monomer (B) having a carboxyl group, (meth)acrylic acid, fumaric acid, and the like may be used.

Examples of the optional copolymerizable monomer, which is used in addition to the monomers (A) and (B), include acrylonitrile, hydroxyethyl acrylate, hydroxypropyl acrylate, propyl acrylate, methyl acrylate, 2-ethylhexyl acrylate, etc.

The total content of the monomeric units having the butyl group (repeating units derived from the monomer having the butyl group) and the monomeric units having the carboxyl group in the molecule of the tackifying polymer is not limited, insofar as the effects of the present invention are not impaired.

In general, the total content of the two monomeric units is at least 65 mole %, preferably at least 72 mole %, particularly preferably from 83 to 100 mole %.

When the total content of these monomeric units is too low, the compatibility of the tackifying polymer with the crystalline polymer may deteriorate.

The content of the monomeric units having the carboxyl group in the molecule of the tackifying polymer is usually from 1 to 25 mole %, preferably from 3 to 22 mole %, particularly preferably from 5 to 20 mole %. When the content of the monomeric units having the carboxyl group is too high, the low temperature adhesion properties may decrease. When this content is too low, the thermal peeling properties may decrease.

The content of the monomeric units having the butyl group in the molecule of the tackifying polymer is usually from 35 to 99 mole %, preferably from 40 to 98 mole %, particularly preferably from 45 to 95 mole %. When the content of the monomeric units having the butyl group is too low, the low temperature adhesion properties and also the thermal peeling properties may deteriorate.

As the tackifying polymer, the acrylic polymer is preferable, since the acrylic polymer can exhibit the good thermal peeling properties and also the good low temperature adhesion properties, when it is combined particularly with polycaprolactone or polycaprolactone polyurethane.

In the adhesive composition of the first embodiment, the content of the tackifying polymer is usually from 49 to 98 wt. %, preferably from 54 to 97 wt. %, particularly preferably from 59 to 96 wt. %. When the content of the tackifying polymer is too high, the thermal peeling properties may deteriorate. When this content is too low, the low temperature adhesion properties may not be effectively improved.

When the tackifying polymer is crosslinked, the removal cleanliness (the property of the adhesive to leave no adhesive component on the adherent surface after peeling) can be improved in addition to the improvement of the low temperature adhesion properties and the thermal peeling properties. The concrete method to crosslink the tackifying polymer will be explained below.

In the first embodiment, the molecular weight of the tackifying polymer is not limited, insofar as the intended effects (thermal peeling properties, low temperature adhesion properties, etc.) are achieved. In general, the weight average molecular weight of the uncrosslinked tackifying polymer is from 100,000 to 2,000,000, preferably from 200,000 to 1,000,000.

Tackifying Polymer in the Second Embodiment

The tackifying polymer used in the second embodiment of the present invention may be prepared by polymerizing a monomer mixture containing the monomer having the alkyl group with 4 to 8 carbon atoms in the molecule, the monomer having the carboxyl group in the molecule, and optionally a copolymerizable monomer like the tackifying polymer used in the first embodiment. Alternatively, the carboxyl groups in the molecule may be converted to the alkyl groups after polymerization.

Now, one preferred example of the acrylic polymer, which is preferably used in the second embodiment, is explained.

Such a polymer is an acrylic polymer prepared by polymerizing a monomer mixture containing (a) a (meth)acrylic monomer having an alkyl group with 4 to 8 carbon atoms in the molecule and (b) a (meth)acrylic monomer having a carboxyl group in the molecule. Such a polymer may be prepared by carrying out the copolymerization by a conventional method such as solution polymerization.

As the (meth)acrylic monomer (a), an alkyl acrylate having 4 to 8 carbon atoms in the alkyl group, an alkoxyalkyl acrylate having 4 to 8 carbon atoms in the alkoxy group, and the like may be used. In particular, acrylates such as n-butyl acrylate, isobutyl acrylate, isooctyl acrylate, 2-ethylhexyl (meth)acrylate, and the like are preferable.

As the (meth)acrylic monomer (b) having a carboxyl group, (meth)acrylic acid, fumaric acid, and the like may be used as in the case of the monomer (B). Among them, (meth)acrylic acid is preferable.

Examples of the optionally used copolymerizable monomer, which is used in addition to the monomers (a) and (b), include acrylonitrile, hydroxyethyl acrylate, hydroxypropyl acrylate, methyl acrylate, etc.

The total content of the monomeric units having the alkyl group with 4 to 8 carbon atoms and the monomeric units having the carboxyl group in the molecule of the tackifying polymer is not limited, insofar as the effects of the present invention are not impaired.

In general, the total content of the two monomeric units is at least 65 mole %, preferably at least 72 mole %, particularly preferably from 83 to 100 mole %.

When the total content of these monomeric units is too low, the compatibility of the tackifying polymer with the crystalline polymer may deteriorate.

The content of the monomeric units having the carboxyl group in the molecule of the tackifying polymer is usually from 1 to 25 mole %, preferably from 3 to 22 mole %, particularly preferably from 5 to 20 mole %. When the content of the monomeric units having the carboxyl group is too high, the low temperature adhesion properties may decrease. When this content is too low, the thermal peeling properties may decrease.

Also in the second embodiment, the acrylic polymer is preferable as the tackifying polymer, since the acrylic polymer can exhibit the good thermal peeling properties and also the good low temperature adhesion properties, when it is combined particularly with polycaprolactone polyurethane.

In the adhesive composition of the second embodiment, the content of the tackifying polymer is usually from 49 to 98 wt. %, preferably from 54 to 97 wt. %, particularly preferably from 59 to 96 wt. %. When the content of the tackifying polymer is too high, the thermal peeling properties may deteriorate. When this content is too low, the low temperature adhesion properties may not be effectively improved.

When the tackifying polymer is crosslinked, the removal cleanliness (the property of the adhesive to leave no adhesive component on the adherent surface after peeling) can be improved in addition to the improvement of the low temperature adhesion properties and the thermal peeling properties. The concrete method to crosslink the tackifying polymer will be explained below.

Crosslinking of the Tackifying Polymer

In the first and second embodiments, a crosslinking component (agent) reactive with the carboxyl group is usually used, when the tackifying polymer is crosslinked. Alternatively, an additional crosslinking functional group such as a hydroxyl group, an epoxy group, etc. may be introduced in the molecule of the tackifying polymer. In the case of a polymer having ethylene bonds in the repeating units like the acrylic polymers, a radial crosslinking reaction with the radiation of electron beams may be used.

The crosslinking component may be any compound having at least two crosslinkable functional groups reactive with the functional groups of the tackifying polymer such as the carboxyl group. Such a compound is usually a monomer or an oligomer.

The crosslinking component is preferably a bisamide crosslinking agent, an epoxy resin, an isocyanate crosslinking agent, etc. when the carboxyl group functions as the crosslinkable functional group. Furthermore, a rosin having a carboxyl group in the molecule (carboxyrosin) may be used as a crosslinking component, when the crosslinkable functional group is the epoxy group Crosslinking Components The epoxy resin reacts with the carboxyl group of the tackifying polymer and functions to thermally crosslink the tackifying polymer. Examples of the epoxy resin include bisphenol A epoxy resins, bisphenol F epoxy resins, cresol-novolak epoxy resins, phenol-novolak epoxy resins, etc.

The epoxy equivalent of the epoxy resin is usually from 70 to 400, preferably from 80 to 300.

As the bisamide crosslinking agent, bisaziridine derivatives of dibasic acids such as isophthaloyl bis(2-methylaziridine) may be used. The bisamide crosslinking agent is particularly preferable since it can react with the tackifying polymer having the carboxyl group at a relatively low temperature and easily achieves the sufficient crosslinking degree.

When the tackifying polymer has the epoxy group in the molecule, preferable crosslinking components are carboxyrosins. The carboxyrosins have the carboxyl group in the molecule and react with the tackifying polymer. Thus, they function to thermally crosslink the tackifying polymer. As the carboxyrosin, gum rosin, wood rosin, tall oil rosin, and their chemically modified products (e.g. polymer rosin, etc.) may be used.

The carboxyrosins may be used singly or in admixture of two or more. Rosins having substantially no carboxyl group may be used together insofar as the effects of the present invention are not impaired.

When the above-described crosslinking component is used, the proportion of the crosslinking component in the whole adhesive composition (whole weight) is usually from 0.01 to 20 wt. %, preferably from 0.05 to 10 wt. %.

A reaction accelerator for the crosslinking component such as an epoxy resin may be compounded in the adhesive composition. Thereby, the thermal crosslinking conditions may be made mild.

The crosslinking components are not limited to those described above, and any other crosslinking component may be selected according to the kinds of the crosslinkable functional groups, crosslinking conditions, etc.

Crystalline Polymer

As described above, the crystalline polymer used according to the present invention usually comprises the polyol units formed from the crystalline polyol in the backbone of the molecule.

Herein, the term "polyol" is intended to mean a polymer or an oligomer, which is substantially non-tacky at room temperature (about 25° C.) and has at least two hydroxyl groups in the molecule.

The term "crystalline" means a property of a polymer to be molten by heating. The melting point of the crystalline polymer depends on the melting point of the polyol contained as the repeating unit. The melting point is usually from 30 to 70° C., preferably from 35 to 65° C., particularly preferably from 40 to 60° C.

The molecular weight of the crystalline polymer is in a range where the desired adhesion force is attained. In general, the crystalline polymer has a weight average molecular weight of from 3,000 to 200,000, preferably from 3,200 to 150,000, more preferably from 3,500 to 130,000. When the weight average molecular weight is too small, the thermal peeling properties and the removal cleanliness may deteriorate. When the molecular weight is too large, the low temperature adhesion properties may decrease. From the viewpoint of the extension of the peeling easy time after heating, the number average molecular weight is preferably from 2,000 to 30,000, more preferably from 2,500 to 28,000.

Crystalline Polyurethane

The recrystallization rate (or the recrystallization completing time) of the crystalline polyurethane used in the first and second embodiments can be very easily controlled, and such a polyurethane can effectively improve the thermal peeling easy properties and also the removal cleanliness.

As described above, the polyol units of the polyurethane are formed from the crystalline polyol. That is, the crystalline polyol is incorporated in the urethane molecule through the reaction of the polyol with a isocyanate compound such as a diisocyanate, and thus forms the crystalline polyol units as the repeating units. The crystalline polyol is preferably selected from crystalline polyester polyol, polyether polyol, polycarbonate polyol, etc. A preferred polyester polyol is polycaprolactone from the viewpoint of the easy control of the crystallization (the crystallinity and the crystallization rate) of the polyurethane. From the same viewpoint, another preferred polyether polyol is polytetramethylene glycol. The polyols may be used independently or as a mixture of two or more of them.

In general, the crystalline polyol as the raw material of the polyurethane has a weight average molecular weight of from 1,000 to 200,000, preferably from 1,500 to 50,000, more preferably from 3,000 to 15,000. When the weight average molecular weight is too small, the crystallinity may not be sufficiently increased, and thus the thermal peeling properties may deteriorate. When the molecular weight is too large, the control of the crystallization rate may be difficult, or the compatibility with the tackifying polymer may decrease. Thus, the thermal peeling easy properties and the removal cleanliness may deteriorate.

The isocyanate compound is usually a diisocyanate having two isocyanate groups in the molecule. As the diisocyanate, at least one of isophorone diisocyanate (IPDI), diphenylmethane diisocyanate (MDI), hydrogenated MDI, tolylene diisocyanate (TDI) and 1,6-hexanediol diisocyanate (HDDI) may be used. Also, compounds having a biuret structure or an isocyanurate structure, which are obtained by the reaction of the above diisocyanates, may be used.

Preferably, aliphatic diisocyanates such as 1,6-hexanediol diisocyanate, isophorone diisocyanate are used to improve the thermal peelability.

To further facilitate the control of the crystallinity and effectively improve the thermal peeling properties, preferably the raw material for the preparation of the polyurethane does not contain a chain extender (a short-chain diol), and consists essentially of the polyol compound and the diisocyanate. A monohydric lower alcohol may be used to deactivate the terminal isocyanate groups of the polyurethane molecules. In such a case, the monohydric alcohol groups are introduced at the molecular ends of the polyurethane, while the backbone except the terminals consists essentially of polymeric units formed from the polyol compound and diisocyanate.

The polyurethane may be formed (or polymerized) by heating a liquid mixture while stirring, which has been prepared by dissolving or dispersing the raw materials in a solvent. As a solvent, a compound having no active hydrogen may be used. Examples of such a solvent include ketones (e.g. methyl ethyl ketone, methyl isobutyl ketone, cyclohexanone, etc.), aromatic hydrocarbons (e.g. toluene, xylene, etc.), esters (e.g. ethyl acetate, etc.)

The mixing ratio of the polyol to the isocyanate is usually represented by the ratio of the mole number (H1) of the OH groups in the whole polyol compound(s) to the mole number (N1) of the NCO groups in the whole isocyanate(s) (H1:N1). This H1:N1 ratio is usually in the range between 1:1 and 1:1.60.

Furthermore, a catalyst which is conventionally used in the preparation of polyurethane (e.g. dibutyltin laurate, etc.) may be used.

When the polyurethane is prepared by the solution polymerization as described above, the solution (or the dispersion) containing the as-produced polyurethane can be used as the polyurethane composition for the production of the adhesive composition of the present invention.

In the case of an adhesive composition comprising the tackifying polymer and the polyurethane having the crystalline polyol units in the molecule, it is possible to substantially suppress the tackiness at room temperature by the crystallization of the polyol units. However, the composition can exhibit the desired level of adhesion force by pressing the adhesive composition to the adherent at room temperature or an elevated temperature. When the higher adhesion force is required, the composition may be heat pressed.

Polycaprolactone

As described above, polycaprolactone is one preferred example of the crystalline polyol. Polycaprolactone can be used as the raw material of the above polyurethane, while it may be used as the crystalline polymer in the first embodiment.

Polycaprolactone used in the present invention may be (i) one obtained by polymerizing a starting material containing caprolactone, or (ii) one having recurring units obtained by ring opening polymerization of caprolactone.

In the case of an adhesive composition comprising the tackifying polymer and polycaprolactone, it is possible to substantially suppress the tackiness at room temperature by the crystallization of polycaprolactone. However, the composition can exhibit the desired level of adhesion force by pressing the adhesive composition to the adherent at room temperature or an elevated temperature. When the higher adhesion force is required, the composition may be heat pressed.

Preparation of Adhesive Composition

The adhesive composition of the first and second embodiments of the present invention may be prepared by uniformly mixing the raw materials by a conventional mixing method. For example, the tackifying polymer, the crystalline polymer, the crosslinking agent, the solvent, etc. are mixed with a mixing apparatus such as a homomixer, a planetary mixer, etc. to homogeneously dissolve or disperse the materials to obtain a liquid composition.

The crystalline polyurethane may be prepared as described above. When the polyurethane is prepared by the polymerization in a solution, the solution containing the as-synthesized polyurethane may be used as the raw material.

Such a liquid composition can be prepared in the form of a liquid (paint) containing the tackifying polymer and the polyurethane by mixing the first solution comprising the dissolved tackifying polymer and the second solution comprising the dissolved crystalline polymer. Then, the liquid is dried to form an adhesive layer comprising the adhesive composition. In such a way, it is possible to form a specific morphology (interlinked structure) of the crystalline polymer and the tackifying polymer having good compatibility with the crystalline polymer, and thus the above-described properties (non-tackiness at room temperature and high adhesion force) can be effectively achieved. When the crosslinking component is added, the third solution comprising the crosslinking component is added to the above paint.

Production of Adhesive Sheet

The adhesive sheet of the present invention can be produced by applying the paint containing the adhesive composition of the first or second embodiment of the present invention on a material and drying the applied composition to form the adhesive layer. For example, the paint of the adhesive composition is applied on a release surface of a liner and dried to form the adhesive layer. Then, a substrate, which is separately provided, is laminated on the adhesive layer to finish the adhesive sheet of the present invention.

Alternatively, the paint of the adhesive composition is applied on one or both surfaces of the substrate and dried to form the respective adhesive layer, the liner is laminated on the adhesive layer to finish the adhesive sheet of the present invention.

When the adhesive layer is formed by the application of the paint, the drying is usually carried out at a temperature of 60 to 180° C. The drying time is usually from several ten seconds to several minutes.

The thickness of the adhesive layer is usually from 5 to 1,000 μm, preferably from 10 to 500 μm, in particular from 15 to 100 μm.

A coating means may be any coating means such as a knife coater, a roll coater, a die coater, a bar coater, etc.

The liner may be made of paper or a plastic film. The paper liner is produced by laminating a release coating (a release layer) such as a polyethylene coating, a silicone coating, etc. on the surface of the paper sheet. When the silicone release coating is laminated, in general, an under coat such as a clay coat, a polyethylene coat, etc. may be laminated on the paper sheet, and then the release coating may be laminated on the under coat.

As the substrate of the adhesive sheet, any conventionally used substrate (support), for example, paper, metal films, polymer films, etc. may be used.

Examples of the polymers of the polymer films include polyimide, polyvinyl chloride, acrylic polymers, polyesters (e.g. polyethylene terephthalate, etc.), polyurethane, polyolefin polymers (including ethylene copolymers such as ethylene-acrylic acid copolymers, etc.), and so on. A light-reflection substrate such as a retroreflective sheet may be used as a substrate. In addition, a laminate of the above exemplified substrates may be used as a substrate.

The substrate may be one allowing visible light or UV rays to transmit therethrough. Also, the substrate may be colored or decorated by printing, etc. In this case, the adhesive sheet of the present invention can be used as a decorative sheet or a marking film.

The thickness of the substrate is usually from 5 to 500 µm, preferably from 10 to 300 µm.

In general, the adhesive layer is fixedly provided on one of the main surfaces of the substrate. When the adhesive sheet is used as a double-coated adhesive tape, the adhesive layers can be fixedly provided on the both main surfaces of the substrate.

When the adhesion between the adhesive layer and the substrate should be increased, a primer may be applied on the surface of the substrate on which the adhesive layer is provided.

The adhesive layer may contain any one of conventional additives, insofar as the effects of the present invention are not impaired. Examples of such additives include viscosity modifiers, defoaming agents, leveling agents, UV ray absorbers, antioxidants, pigments, inorganic particles (e.g. glass beads, etc.), fungicides, fine particles of tacky polymers or non-tacky rubbery polymers, tackifiers, catalysts to accelerate the crosslinking reaction, etc.

Use of the Adhesive Sheet

The adhesive sheet of the present invention may be used as a thermal-peeling-easy adhesive sheet (thermally peelable adhesive sheet).

The adhesive layer of such an adhesive sheet is characterized in that (1) it contains the crystalline polymer and the tackifying polymer, (2) the tackifying polymer is compatible with the crystalline polymer when the layer is heated to the melting point of the crystalline polymer, and (3) the tackifying polymer is crosslinked.

Because of these characteristics, the present invention can provide the thermal-easy-peeling adhesive sheet, <1> which can improve the thermal-peeling-easy properties that achieve the easily peelable state by heating it at a specific temperature to decrease the peel strength to a value smaller than that prior to heating, on a desired occasion after it is adhered to an adherent, <2> which can maintain such an easily peelable state, and prolong the easily peelable time to a desired period of time, <3> which can improve the removal cleanliness, that is, it can be peeled off without transferring the adhesive onto the adherent, and <4> which can improve the readhesion properties, that is, after peeling, it can be easily readhered to an adherent by pressing it to the adherent.

In the adhesive composition used in the present invention, since the tackifying polymer is compatible with the molten crystalline polymer, it advantageously retards the recrystallization of the crystalline polymer after heating. In addition, the melting and recrystallization of the crystalline polymer in the adhesive composition are substantially reversible physical changes (phenomena). Thus, the composition can restore substantially the same state as that prior to heating, when and after it is readhered subsequent to the heating of the composition. Furthermore, the composition can be again peeled off after it is readhered.

The thermal-peeling-easy adhesive sheet of the present invention can be adhered only by pressing at a specific ambient temperature (about 5 to 30° C.), when the relatively large amount of the tackifying polymer is contained in the adhesive layer. In addition, it can be adhered by heat pressing, when the content of the tackifying polymer is relatively small, or it is adhered to an adherent to which the adhesion of an adhesive is difficult. Furthermore, the adhesive composition may be readhered to the adherent while it is not cooled after the thermal peeling.

Since the cohesive force is effectively increased by the crosslinking, the transfer of the tackifying polymer onto the adherent can be avoided when the adhesive composition is peeled off. In the peeling-easy state, the crystalline polymer is intimately mixed with the crosslinked tackifying polymer. Thus, the adhesive transfer of the entire adhesive composition can be prevented without requiring the crosslinking of the crystalline polymer, which will prevent the melting-recrystallization process.

When the adhesive sheet according to the present invention is used with adhering it to a suitable adherent, the adhesion is completed by pressing the film adhesive to the adherent under a pressure of 1 to 50 kg/cm$^2$ (about 0.1 to 4.9 MPa) after laminating the film adhesive on the adherent. In the course of pressing, the initial adhesion force may be increased by heating and cooling (spontaneous cooling).

Examples of the adherent to be used include adherents having the surfaces (adhering surfaces) made of (1) metals such as aluminum, stainless steel, copper, zinc-plated steel plate, etc., (2) resins such as polyimide, acrylic resins, polyurethane, melamine resins, epoxy resins, vinyl chloride resins, etc., and (3) inorganic oxide materials such as ceramics, etc. Also, adherents having coated surfaces as the adhering surfaces may be used.

The thermal-peeling-easy adhesive sheet of the present invention can be adhered to the adherent after the positioning by simply pressing or by heat pressing followed by cooling. The adhesive sheet, which can be press adhered, is preferably used as an adhesive sheet having a relatively large area (in general, at least 400 cm$^2$) (e.g. interior or exterior decorative sheets), or relatively large-size retroreflective sheets for road signs. Furthermore, the adhesive sheet of the present invention can be used as an application tape or film or a masking tape (or film) for use in the production of electronic parts, since it can be adhered to the adherent with the desired peel strength and peeled off at any time by heating without the adhesive transfer.

When the silicone-free adhesive surface is necessary, the adhesive sheet of the present invention can be used as follows:

The adhesive sheet laminated on the liner having the silicone coating is useful since it can be peeled with a low force. However, in the case of the adhesive sheet used in the production of electronic equipment, it is sometimes preferable that the silicone does not remain on the adhesive surface of the sheet even in a trace amount (silicone free). In such a case, a non-silicone polymer film or a metal foil is used as a liner which is combined with the adhesive sheet of the present invention. The adhesive sheet having such a liner is stored and transported at room temperature (about 15 to 30° C.). When the liner is peeled off in the production process of the electronic equipment, the adhesive sheet is heated and removed from the liner, and then used to adhere an electronic parts.

When the adhesive sheet is thermally peeled off, it is usually heated at a temperature of 60 to 120° C. for 30 seconds to 5 minutes. The easy-peeling time lasts at least 30 seconds, preferably at least 1 minute, particularly preferably at least 5 minutes after the heating to peel the adhesive sheet.

The easy-peeling condition may be maintained even when the adherent and the adhesive layer are cooled to room temperature (about 25° C.), but the adhesion force (peel strength) again increases after about 15 minutes from cooling to finish the readhesion.

In the course of the thermal peeling, the adherent and/or the adhesive sheet may be heated with a heating apparatus such as an iron, a drier, an IR (far IR) lamp, etc. When the substrate comprises a metal foil, the adhesive sheet may be heated by an electromagnetic induction heating method. Furthermore, the adherent and/or the adhesive sheet may be heated with a heat transfer medium such as a liquid or steam.

The peel strength of the adhesive sheet prior to heating for peeling off is usually larger than 12 N/25 mm, preferably from 13 to 40 N/25 mm, when it is measured by the 180 degrees peeling test at a peeling rate of 300 mm/min. An optimum range of the peel strength in the thermal peeling process can be suitably selected according to the mechanical strength of the substrate (e.g. elastic modulus, elongation at break, etc.), peeling conditions (e.g. peeling rate), and so on. From the viewpoint of quick peeling, the peel strength is preferably 12 N/25 mm or less, when it is measured by the 180 degrees peeling test at a peeling rate of 300 mm/min.

EXAMPLES

The present invention will be illustrated by the following Examples, in which "parts" are all "parts by weight".

Examples 1–5

Preparation of Tackifying Polymers

An acrylic tackifying polymer used in each Example was prepared as follows:

Acrylic monomers (starting monomers) shown in the column "Composition" of Table 1 in the molar ratio in Table 1 were dissolved in a solvent to obtain a monomer solution. The kind of the solvent used in each Example is shown in the column "Solvent" of Table 1.

Then, azobis-2,4-dimethylvaleronitrile (0.15 part) was added as an initiator to the monomer solution, and the monomer solution was polymerized at 45° C. for 2 hours, and further at 65° C. for 3 hours under a nitrogen atmosphere to obtain a tackifying polymer solution.

The glass transition temperature (Tg) of the tackifying polymer used in each Example was measured as follows:

The tackifying polymer solution was applied on a release paper and dried to form the film of the tackifying polymer (thickness: about 30 μm). Using this film as a test specimen, a dissipation factor (tan δ) was measured with a dynamic viscoelastic spectrometer (RDA-II manufactured by RHEOMETRIX). A temperature range was from −60 to 200° C., a mode was a torsion mode, a frequency was 1 rad/sec. Then, the glass transition temperature was calculated from the measured value of the dissipation factor. The results are shown in Table 1.

Preparation of Crystalline Polyurethane

Some Examples used polyurethane, which was prepared as follows, as a crystalline polymer.

Polycaprolactone (PLACCEL® 240 manufactured by Daicel Chemical Industries, Ltd.; Mw=11,000, Mw/Mn=1.9) was used as a crystalline polymer for the preparation of polyurethane.

Polycaprolactone and isophorone diisocyanate (IPDI) were mixed in a molar ratio of 2:3 and polymerized in toluene. In the polymerization process, to the toluene solution, dibutyltin dilaurate (catalyst) was added in an amount of 0.5 wt. % based on the weight of polycaprolactone, and the solution was heated at 80° C. for 5 hours under a nitrogen atmosphere. Thereafter, 10 wt. % of n-propanol based on the weight of polycaprolactone was added to the above solution, and the mixture was heated at 80° C. for 1 hour to complete the polymerization. Thus, the polyurethane solution having a solid content of 30 % was obtained. The polyurethane obtained by the above polymerization had a weight average molecular weight (Mw) of 120,000 and a molecular weight distribution (Mw/Mn) of 6.0.

Crystalline Polycaprolactone

In other Examples, polycaprolactone manufactured by Daicel Chemical Industries (PLACCEL® 220N; Mw=3,800, Mw/Mn=1.4) was used. Using the toluene solution of the polycaprolactone (non-volatile content of 60 wt. %), adhesive composition solutions were prepared as described below.

Preparation of Adhesive Composition Solutions

The solution of the tackifying polymer and the solution of the crystalline polymer, which were prepared in the above, were mixed at the specified weight ratio of the non-volatile components. To the mixed solution, 0.2 wt. parts of isophthaloylbis(2-methylaziridine) as a crosslinking agent was added to obtain a solution of the adhesive composition of Examples 1–5 (hereinafter referred to as "adhesive solution").

All the adhesive solutions were transparent without white turbidity or gellation. Thus, it can be seen that the tackifying polymer and the crystalline polymer used in each Example were well compatible with each other.

The weight ratio of the tackifying polymer (TAP) to the crystalline polymer (CP) was 80:20 (in Examples 1, 2, 4 and 5) or 70:30 (in Example 3). The combinations of the crystalline polymer and the tackifying polymer are shown in Table 2.

Production of Adhesive Sheets

Each adhesive solution was applied on the release surface of a liner and dried at 90° C. for 5 minutes to form an adhesive layer of each adhesive composition, which had a thickness of 30 μm. Over the adhesive sheet, a substrate made of the film of a vinyl chloride homopolymer having a thickness of 50 μm was dry laminated to obtain an adhesive sheet of each Example.

The used liner was a paper liner comprising the undercoats of polyethylene on both surfaces of the paper sheet, and silicone release coatings on the undercoats, and had a thickness of 140 μm. The Ra of the release surface was 0.7 μm.

Comparative Example 1

An adhesive composition and an adhesive sheet were prepared in the same manner as in Example 3 except that a tackifying polymer was prepared using the monomer composition of Table 1 such that the content of the monomeric units having the alkyl group with 4 to 8 carbon atoms (actually a butyl group) in the tackifying polymer was 57 mole %, and the weight ratio of the tackifying polymer (TAP) to the crystalline polymer (CP) was 80:20.

The Tg of the tackifying polymer used in this Comparative Example was measured as in Example 3. The result is shown in Table 1. It can be seen that the Tg of the tackifying polymer of Comparative Example 1 was higher than any of the tackifying polymers of Examples 1–5.

The adhesive solution prepared in this Comparative Example was transparent without white turbidity or gellation.

The properties of the adhesive sheets produced in the above Examples were measured as follows. The results are shown in Table 2.

(1) Low Temperature Adhesion Properties

The adhesive sheet was adhered to a stoved melamine coated plate (available from PALTEC) at 5° C. according to JIS Z 0237 8.2.3. to obtain a sample. After maintaining the prepared sample at 5° C. for 3 hours, a 180 degree peel strength was measured with a TENSILON at a peeling rate of 300 mm/min. This peel strength was used as a value to evaluate the low temperature adhesion properties. The results are shown in Table 2.

As shown in Table 2, the adhesive sheets of Examples 1–5 had the evaluation value of 10 N/25 mm or larger, which was larger than that of Comparative Example 1. The adhesive sheets of Examples 1–4 using the tackifying polymers containing no alkyl group with more carbon atoms than the butyl group exhibited better low temperature properties than the adhesive sheet of Example 5 using the tackifying polymer containing the alkyl group with 8 carbon atoms.

(2) Adhesion Force at 20° C.

The adhesive sheet was adhered to the same stoved melamine coated plate as used in (1) at 20° C. to obtain a sample.

Then, the 180 peeling strength was measured in the same manner as in (1) using this sample except that the sample was maintained at 20° C. for 48 hours before measurement. This peel strength was used as a value to evaluate the adhesion force at 20° C. The results are shown in Table 2.

(3) Adhesion Force After Heating and Thermal Peeling Easiness

The adhesive sheet was adhered to the same stoved melamine coated plate as used in (2) to obtain a sample.

After maintaining the sample at 20° C. for 48 hours, the sample was heated up to about 100° C. with an industrial drier and then cooled at room temperature for 1 minutes. After that, the 180 degree peeling test was conducted in the same manner as in (2). This peel strength was used as a value to evaluate the adhesion force after heating. The results are shown in Table 2.

Then, the thermal peeling easiness was evaluated by comparing the adhesion force after heating and the adhesion force at 20° C. As a result of the evaluations, it can be seen that the adhesive sheets of Examples 1–5 and Comparative Example 1 had good thermal peeling easiness.

(4) Removal Cleanliness

The surface of the melamine coated plate was visually observed after peeling the adhesive sheet in the above peeling test (3), and the presence of the residue of the adhesive composition was checked. As a result, it was found that no residue of the adhesive compositions was observed and the adhesive compositions had good removal cleanliness in Examples 1–5 and Comparative Example 1.

According to the present invention, the low temperature adhesion properties of the adhesive composition can be improved without the use of components having relatively low molecular weights like a tackifier, a plasticizer, etc, which may deteriorate the removal cleanliness, as can be seen from the above Examples.

Therefore, according to the present invention, it is possible to produce a thermally peelable adhesive composition having the improved removal cleanliness and low temperature adhesion properties in the absence of the tackifier or the plasticizer.

TABLE 1

| | Composition | Molar ratio | Wt. Av. Molecular weight (×10$^4$) | Tg (° C.) | Solvent |
|---|---|---|---|---|---|
| TAP1 | BA:AA | 83:17 | 63 | −17 | Toluene/ethyl acetate |
| TAP2 | BA:AA | 93:7 | 58 | −28 | Toluene/ethyl acetate |
| TAP3 | 2EHA:BA: MA:AA | 23:49: 16:12 | 59 | −22 | Toluene/ethyl acetate |
| TAP4 | BA:AN:AA | 86:7:7 | 59 | −21 | Toluene/ethyl acetate |
| TAP5 | IOA:AA | 78:22 | 120 | −8 | Toluene |
| TAP6 | PEA:HPPA: BA:AA | 23:10: 57:10 | 56 | −6 | Ethyl acetate/ methyl ethyl ketone |

The meanings of the abbreviations in Table 1 are as follows:
BA: butyl acrylate;
2EHA: 2-ethylhexyl acrylate;
MA: methyl acrylate;
AA: acrylic acid;
AN: acrylonitrile;
IOA: isooctyl acrylate;
PEA: phenoxyethyl acrylate;
HPPA: 2-hydroxy-3-phenoxypropyl acrylate

TABLE 2

| Ex. No. | TAP | CP | Adhesion Force at 5° C. (N/ 25 mm) | Adhesion Force at 20° C. (N/ 25 mm) | Adhesion force after heating (N/25 mm) | Removal cleanliness |
|---|---|---|---|---|---|---|
| 1 | TAP1 | Polyurethane | 19 | 17 | 13 | OK |
| 2 | TAP2 | Polyurethane | 19 | 13 | 8 | OK |
| 3 | TAP3 | Polycaprolactone | 26 | 20 | 5 | OK |
| 4 | TAP4 | Polyurethane | 17 | 13 | 7 | OK |
| 5 | TAP5 | Polyurethane | 10 | 21 | 12 | OK |
| C. 1 | TAP6 | Polycaprolactone | 3 | 14 | 7 | OK |

Examples 6–10

In Examples 6 and 7, an adhesive composition and an adhesive sheet were prepared in the same manner as in Example 4 except that the molecular weight of the crystalline polyurethane was changed as follows:

Example 6: Weight average molecular weight (Mw)=35,000 Molecular weight distribution (Mw/Mn)=2.3

Example 7: Weight average molecular weight (Mw)=60,000 Molecular weight distribution (Mw/Mn)=2.4

In Examples 8 and 9, an adhesive composition and an adhesive sheet were prepared in the same manner as in Example 6 except that the weight ratio of the tackifying polymer (TAP) to the crystalline polyurethane (PC) was changed as follows:

Example 8: TAP:CP=90:10

Example 9: TAP:CP=95:5

In Example 10, an adhesive composition and an adhesive sheet were prepared in the same manner as in Example 7 except that the weight ratio of the tackifying polymer (TAP) to the crystalline polyurethane (PC) was changed as follows:

Example 10: TAP:CP=90:10

All the adhesive solutions prepared in Examples 6 to 10 were transparent without white turbidity or gellation.

Each adhesive sheet of the above Examples were evaluated in the same manner as in Example 4. The results are shown in Table 3.

TABLE 3

| Ex. No. | TAP | CP | Adhesion Force at 5° C. (N/ 25 mm) | Adhesion Force at 20° C. (N/ 25 mm) | Adhesion Force after Heating (N/25 mm) | Removal cleanliness |
|---|---|---|---|---|---|---|
| 6 | TAP4 | Polyurethane | 18 | 16 | 7 | OK |
| 7 | TAP4 | Polyurethane | 18 | 15 | 7 | OK |
| 8 | TAP4 | Polyurethane | 18 | 15 | 6 | OK |
| 9 | TAP4 | Polyurethane | 17 | 13 | 9 | OK |
| 10 | TAP4 | Polyurethane | 18 | 16 | 7 | OK |

Comparative Example 2

An adhesive composition was prepared in the same manner as in Example 1 except that a monomer mixture used in the preparation of the tackifying polymer was prepared by mixing 83 mole % of 2-methylbutyl acrylate (having 5 carbon atoms in the alkyl group) and 17 mole % of acrylic acid, and the tackifying polymer was prepared by polymerizing this monomer mixture. The tackifying polymer had a weight average molecular weight of 370,000 and Tg of $-5°$ C.

The adhesive solution of this Comparative Example was whitely turbid, and thus the tackifying polymer and the crystalline polyurethane seemed to be poorly compatibilized.

Furthermore, an adhesive sheet, which was prepared in the same manner as in Example 1 except that the above adhesive composition of this Comparative Example was used, had the relatively low thermal peeling easy properties, and the removal cleanliness was ranked "NG".

Example 11

An adhesive composition of this Example was prepared in the same manner as in Example 5 except that the weight average molecular weight of the tackifying polymer was changed to 560,000. Then, an adhesive sheet was prepared in the same manner as in Example 5 except that the above adhesive composition of this Example was used, and the thermal peeling easiness was evaluated according to the procedure of (3) described above.

With the adhesive sheet of this Example, the peeling was easy up to about 30 seconds just after heating the sample and cooling it to room temperature. However, after one minutes from the cooling to room temperature, the adhesion force after heating was the same as or larger than the adhesion force at 20° C. Thus, the adhesive composition was evaluated to have the lower thermal peeling easiness than that of Example 5, although its thermal peeling easiness was practically acceptable.

In this Example, the weight average molecular weight of the tackifying polymer was lower than that of the polymer used in Example 5 (Mw=1,200,000). Thus, the compatibility of the tackifying polymer with the crystalline polymer (polyurethane) seemed to be relatively low.

Example 12

A tackifying polymer was prepared in the same manner as in Example 3 except that a monomer mixture for the preparation of the tackifying polymer was prepared by mixing 26% by mole of 2-ethylhexyl acrylate, 38% by mole of butyl acrylate and 22% by mole of methyl acrylate, and an adhesive composition of this Example was prepared in the same manner as in Example 3 except that the above-prepared tackifying polymer was used. The weight average molecular weight of the tackifying polymer was 460,000.

Then, an adhesive sheet was prepared in the same manner as in Example 3 except that the above adhesive composition of this Example was used, and the thermal peeling easiness was evaluated according to the procedure of (3) described above.

With the adhesive sheet of this Example, the peeling was easy up to about 30 seconds just after heating the sample and cooling it to room temperature. However, after one minutes from the cooling to room temperature, the adhesion force after heating was the same as or larger than the adhesion force at 20° C. Thus, the adhesive composition was evaluated to have the lower thermal peeling easiness than that of Example 3, although its thermal peeling easiness was practically acceptable.

In this Example, the content of the monomeric units having the butyl groups in the tackifying polymer was lower than that in Example 3 (49% by mole). Thus, the compatibility of the tackifying polymer with the crystalline polymer (polycaprolactone) seemed to be relatively low.

Comparative Example 3

A tackifying polymer was prepared in the same manner as in Example 3 except that a monomer mixture for the preparation of the tackifying polymer was prepared by mixing 51% by mole of isooctyl acrylate, 35% by mole of methyl acrylate and 14% by mole of acrylic acid, and an adhesive composition of this Comparative Example was prepared in the same manner as in Example 3 except that the above-prepared tackifying polymer was used. The weight average molecular weight of the tackifying polymer was 360,000.

Then, an adhesive sheet was prepared in the same manner as in Example 3 except that the above adhesive composition of this Example was used, and the thermal peeling easiness was evaluated according to the procedure of (3) described above.

As a result, the adhesion force exceeded the adhesion force at 20° C. after 10 seconds from cooling to room temperature following heating up to about 100° C. Thus, no peeling easiness was exhibited. Accordingly, the composition of this Comparative Example was evaluated to have insufficient thermal peeling easiness. This may be because the tackifying polymer has low compatibility with the crystalline polymer (polycaprolactone).

We claim:

1. An adhesive composition comprising a crystalline polymer and a tackifying polymer compatible with said crystalline polymer at a temperature higher than the melting point of said crystalline polymer, characterized in that said crystalline polymer comprises polyol units formed from a crystalline polyol as repeating units in the molecule units, wherein the polyol units include an alkylene backbone with 4 to 6 carbon atoms, said tackifying polymer has an alkyl group with 4 to 8 carbon atoms and a carboxyl group in the molecule, a content of the monomeric units having said alkyl group with 4 to 8 carbon atoms (repeating units derived from a starting monomer having said alkyl group) is 60 to 99 mole % of the whole monomeric units of said tackifying polymer, and said alkyl group includes a butyl group.

2. An adhesive composition comprising a crystalline polymer and a tackifying polymer compatible with said crystalline polymer at a temperature higher than the melting point of said crystalline polymer, characterized in that said crystalline polymer is polyurethane which comprises polyol units formed from a crystalline polyol as repeating units in the molecule, wherein said polyol units include an alkylene backbone with 4 to 6 carbon atoms, said tackifying polymer has an alkyl group wit 4 to 8 carbon atoms and a carboxyl group in the molecule, a content of the monomeric units having said alkyl group with 4 to 8 carbon atoms (repeating units derived from a starting monomer having said alkyl group) is 60 to 99 mole % of the whole monomeric units of said tackifying polymer, and said tackifying polymer has a weight average molecular weight of 500,000 to 2,000,000.

3. An adhesive sheet comprising a substrate, and an adhesive layer provided on at least one of the main surfaces of said substrate, wherein said adhesive layer comprises the adhesive composition according to claim 1.

4. An adhesive sheet comprising a substrate, and an adhesive layer provided on at least one of the main surfaces of said substrate, wherein said adhesive layer comprises the adhesive composition according to claim 2.

* * * * *

UNITED STATES PATENT AND TRADEMARK OFFICE
CERTIFICATE OF CORRECTION

PATENT NO. : 7,108,911 B1
APPLICATION NO. : 10/399744
DATED : September 19, 2006
INVENTOR(S) : Hidetoshi Abe It is certified that error appears in the above-identified patent and that said Letters Patent is hereby corrected as shown below:

First Page,
Col. 2 (56) (Foreign Patent Documents), Line 2, Before "JP–A–6–510548" delete "EP" and insert -- JP --, therefor.

Column 5,
Line 39 (approx.), Delete "An" and insert -- an --, therefor.
Line 57, Delete "tackiyfing" and insert -- tackifying --, therefor.

Column 7,
Line 5, Delete "polyurthane" and insert -- polyurethane--, therefor.

Column 8,
Line 50, Delete "nitrite" and insert -- nitrile --, therefor.

Column 11,
Line 34, After "group" insert -- . --.

Column 12,
Lines 41-42, Delete "thermal peeling easy" and insert -- thermal-peeling-easy --, therefor.
Line 46, Delete "a" and insert -- an --, therefor.
Line 66, Delete "thermal peeling easy" and insert -- thermal-peeling-easy --, therefor.

Column 13,
Line 31, After "etc.)" insert -- . --.

Column 21,
Line 49, Delete "thermal peeling easy" and insert -- thermal-peeling-easy --, therefor.

UNITED STATES PATENT AND TRADEMARK OFFICE
CERTIFICATE OF CORRECTION

PATENT NO. : 7,108,911 B1
APPLICATION NO. : 10/399744
DATED : September 19, 2006
INVENTOR(S) : Hidetoshi Abe It is certified that error appears in the above-identified patent and that said Letters Patent is hereby corrected as shown below:

Column 24,
Line 5, In Claim 2, delete "wit" and insert -- with --, therefor.

Signed and Sealed this

Twentieth Day of February, 2007

JON W. DUDAS
*Director of the United States Patent and Trademark Office*